United States Patent
Gundlach et al.

(10) Patent No.: US 6,946,958 B2
(45) Date of Patent: Sep. 20, 2005

(54) CONTACTLESS DATA STORAGE MEDIUM

(75) Inventors: Harald Gundlach, Grünwald (DE); Michael Hochholzer, Ottobrunn (DE); Gerald Holweg, Graz (AT); Andreas Müller-Hipper, Regensburg (DE); Jens Riedel, Wangerland (DE); Walter Kargl, Graz (AT)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/437,398

(22) Filed: May 13, 2003

(65) Prior Publication Data

US 2004/0074975 A1 Apr. 22, 2004

Related U.S. Application Data

(63) Continuation of application No. PCT/DE01/04181, filed on Nov. 7, 2001.

(30) Foreign Application Priority Data

Nov. 13, 2000 (DE) .......................................... 100 56 148

(51) Int. Cl.⁷ .......................... H04Q 7/00; G08C 19/00
(52) U.S. Cl. ............................ 340/539.21; 340/825.72; 340/572.7; 340/5.61; 343/751; 455/134
(58) Field of Search .................. 340/539.21, 825.69, 340/825.72, 572.1, 572.7, 5.61, 5.6, 5.64, 10.1, 10.51; 235/375, 380, 382; 343/713, 742, 728, 751, 842, 867, 873; 455/421, 115.1, 115.3, 115.4, 134; 3450/539.21, 825.69, 825.72, 572.1

(56) References Cited

U.S. PATENT DOCUMENTS

| | | | |
|---|---|---|---|
| 3,727,230 A | * 4/1973 | Doi ............................ | 343/795 |
| 4,506,148 A | 3/1985 | Berthold et al. ............ | 235/380 |
| 4,646,090 A | 2/1987 | Mawhinney ................. | 342/44 |
| 4,736,207 A | 4/1988 | Siikarla et al. ............. | 235/492 |
| 5,572,226 A | 11/1996 | Tuttle ......................... | 343/895 |
| 5,621,913 A | 4/1997 | Tuttle et al. ............... | 455/41.2 |
| 5,682,143 A | 10/1997 | Brady et al. ............. | 340/572.7 |
| 5,719,586 A | * 2/1998 | Tuttle ......................... | 343/726 |
| 5,776,278 A | * 7/1998 | Tuttle et al. ................ | 156/213 |
| 6,164,551 A | 12/2000 | Altwasser ................... | 235/492 |
| 6,181,287 B1 | * 1/2001 | Beigel ........................ | 343/741 |
| 6,398,116 B1 | 6/2002 | Kreft .......................... | 235/492 |

FOREIGN PATENT DOCUMENTS

| | | |
|---|---|---|
| DE | 31 43 915 A1 | 5/1983 |
| DE | 37 00 101 A1 | 8/1987 |
| DE | 196 33 923 A1 | 2/1998 |
| DE | 197 26 335 C2 | 12/1998 |
| EP | 0 913 711 A1 | 5/1999 |
| EP | 0 977 145 A2 | 2/2000 |
| RU | 1819360 A3 | 5/1993 |
| WO | 98/03938 | 1/1998 |

* cited by examiner

*Primary Examiner*—Donnie L. Crosland
(74) *Attorney, Agent, or Firm*—Laurence A. Greenberg; Werner H. Stemer; Ralph E. Locher

(57) ABSTRACT

A contactless data storage medium has at least two antennas, in each case for different transmission bands. This makes it possible to configure a data storage medium such that it can be operated with read/write units that operate in accordance with different standards. At least two of the antennas form a unit, so that a configuration such as this can be produced at very low cost.

5 Claims, 2 Drawing Sheets

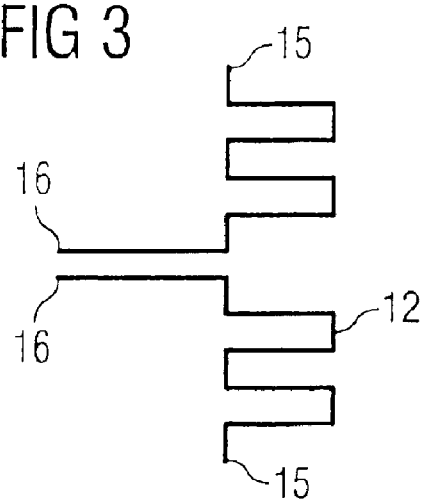
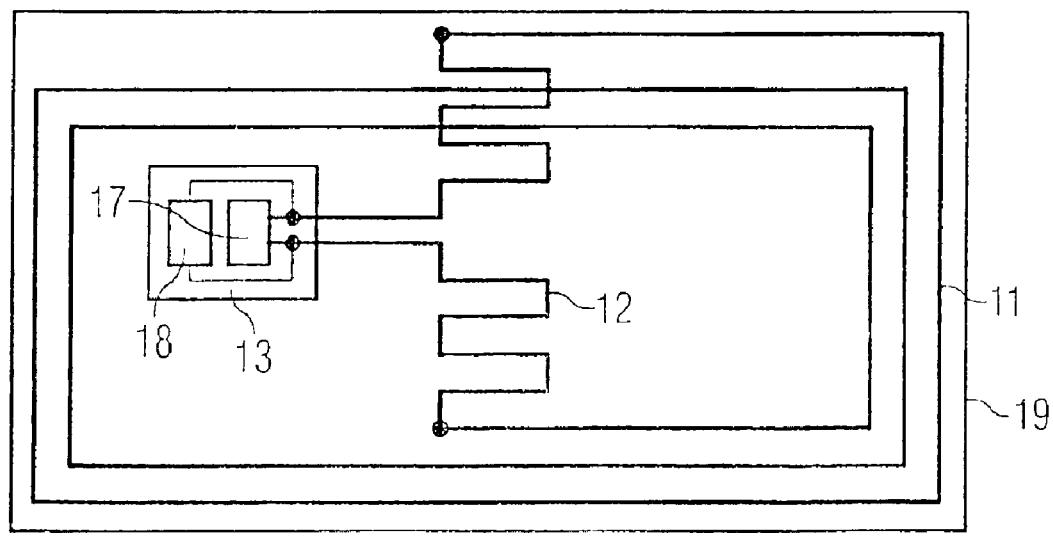

CONTACTLESS DATA STORAGE MEDIUM

CROSS-REFERENCE TO RELATED APPLICATION

This application is a continuation of copending International Application No. PCT/DE01/04181, filed Nov. 7, 2001, which designated the United States and was not published in English.

BACKGROUND OF THE INVENTION

Field of the Invention

The invention relates to a data storage medium which is suitable for contactless data transmission.

The field of contactless power and data transmission is subject to widely different system requirements which differ primarily in terms of the range, the transmission medium, multi-TAG capability, that is to say the capability to identify two or more TAGs in the pull-in range of a write/read unit, and transaction times. In addition to the system requirements, there are specific national regulations that specify that only specific frequencies may be used.

Goods are often provided with contactless data storage media in order in this way to make it possible to identify the goods electronically. In the case of a sorting system for packets, for example, the destination and other data such as the dimensions and weight of the packet are stored in a computer. A contactless data storage medium with the identification number stored in it is stuck to the packet, so that it is possible at any time to use the identification number in conjunction with the data stored in the computer to find out the destination of the packet. This greatly simplifies the process of automatically sorting the packets. However, problems still arise when goods are sent abroad, where other regulations apply, so that a foreign sorting system can no longer read and use the identification number of the packet, since the operating frequency is different.

In other applications, an object passes through a number of workstations, for example during production. The boundary conditions for identification of the contactless data storage medium differ on each occasion, for example a particularly low field strength may be required at one workstation in order to avoid interfering with other devices while, in contrast, a particularly long range may be required at another workstation. This can often not be achieved by a single operating frequency. In addition, it may be necessary to use different types of fields since electrical and inductive fields have different characteristics and these in turn differ from those of electromagnetic waves. The expression "transmission band" is used in the following text for the capability to be able to receive data at a specific frequency via a specific type of field. This, of course, includes the capability to transmit data in this band.

As a capability to vary reception parameters, U.S. Pat. No. 5,572,226 discloses, for example, the use of two or more antennas, with continuous switching between the antennas and measurement of the strength of the received signal being used to determine the antenna constellation in which the communication with a read/write device should take place. However, this is relatively complex.

SUMMARY OF THE INVENTION

It is accordingly an object of the invention to provide a contactless data storage medium that overcomes the above-mentioned disadvantages of the prior art devices of this general type, which can be used in different transmission bands and which nevertheless can be produced at low cost.

With the foregoing and other objects in view there is provided, in accordance with the invention, a contactless data storage medium. The storage medium contains a data processing unit having a device for identifying a transmission band with a strongest received signal, and a received signal preprocessing unit being be set to the transmission band. At least two antennas for respectively different transmission bands are provided. At least two of the antennas are directly connected to one another.

According to the invention, the object is achieved by a data storage medium having a data processing unit and at least two antennas, which are intended for reception, in each case for different transmission bands, with at least two of the antennas forming a unit. There is therefore no need to switch between the antennas in the configuration according to the invention.

In one advantageous development of the invention, the data processing unit has a device for identifying the transmission band with the strongest received signal, and a received signal preprocessing unit can be set to the transmission band.

The frequencies for data storage media differ widely. In the so-called very high frequency (VHF) band, one normal frequency is 13.56 MHz. Frequencies of 868 MHz, 915 MHz and 2.45 GHz can be used in the so-called ultra high frequency (UHF) band. It is impossible to cover this frequency band with a single antenna since the data and power are transmitted via an inductive field in the 13.56 MHz range, while electromagnetic waves are used for frequencies in the UHF band.

The data processing unit can be configured without any major problems such that it can process different frequencies, while this is not possible for the antenna. According to the invention, at least two antennas are therefore used, which are each suitable for different transmission bands. A dipole antenna is suitable for the UHF band, and a loop antenna is suitable for the VHF band. The data processing unit now just needs to identify the antenna in which the stronger received signal is present, by which device it is possible to identify the standard that the read/write unit is using as the basis for processing.

It is furthermore advantageous for the data storage medium to have an additional capacitive antenna. This also covers the third possible transmission path of the data storage medium according to the invention. An optimum frequency and type of field can thus be used for each operating band, without needing to take into account the characteristics of the contactless data storage medium.

Further advantages are obtained if the antenna that is not used for the transmission of data is used for the transmission of power in order to supply power to the contactless data storage medium.

In order to produce the various antennas, it is advantageous if, although they form a unit, they are, however, manufactured in different steps during production, and are then assembled.

Other features which are considered as characteristic for the invention are set forth in the appended claims.

Although the invention is illustrated and described herein as embodied in a contactless data storage medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is an illustration of a dipole antenna; and

FIG. 4 is an illustration of a combination of the antennas shown in FIGS. 2 and 3 in a data storage medium, as a second exemplary embodiment.

DESCRIPTION OF THE PREFERRED EMBODIMENTS

Figure 1:
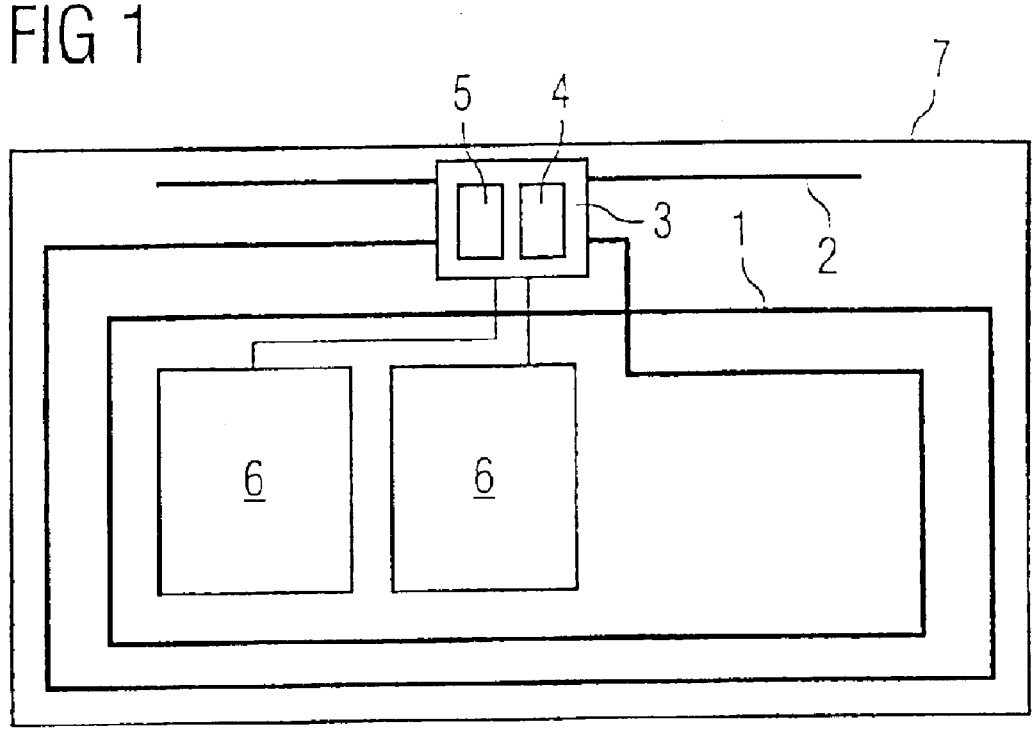
FIG. 1 is a diagrammatic illustration of a first exemplary embodiment of a data storage medium according to the invention with three separate antennas.

Referring now to the figures of the drawing in detail and first, particularly, to FIG. 1 thereof, there are shown three different antennas provided on a contactless data storage medium 7, namely a loop antenna 1, a dipole antenna 2 and a capacitive antenna 6, which are each connected to a data processing unit 3. The data processing unit 3 has a device 4 for identifying a transmission band with the strongest received signal. In this case, the signals received by the three antennas 1, 2 and 6 are monitored. When the data storage medium is located in the area of a read/write unit which is working in the UHF band, then a stronger received signal will be present at the output of the dipole antenna 2 than from the antenna 1 which is suitable for the VHF band and from the capacitive antenna 6 for transmission via a capacitive field. A corresponding situation applies when signals are transmitted in the other frequency bands, or via a capacitive field. Thus, in this exemplary embodiment, the identification of a transmission band with the strongest received signal is equivalent to the selection of the antenna 1, 2 or 6 with the strongest received signal. The detected transmission band is used to set a received signal preprocessing unit 5 such that it is possible to process frequencies in the detected frequency band using the respectively most suitable antennas. The antennas 1 and 2 are matched to one another such that there is no need for isolation between the antenna connections, and the antennas 1 and 2 do not interfere with one another.

Figure 2:
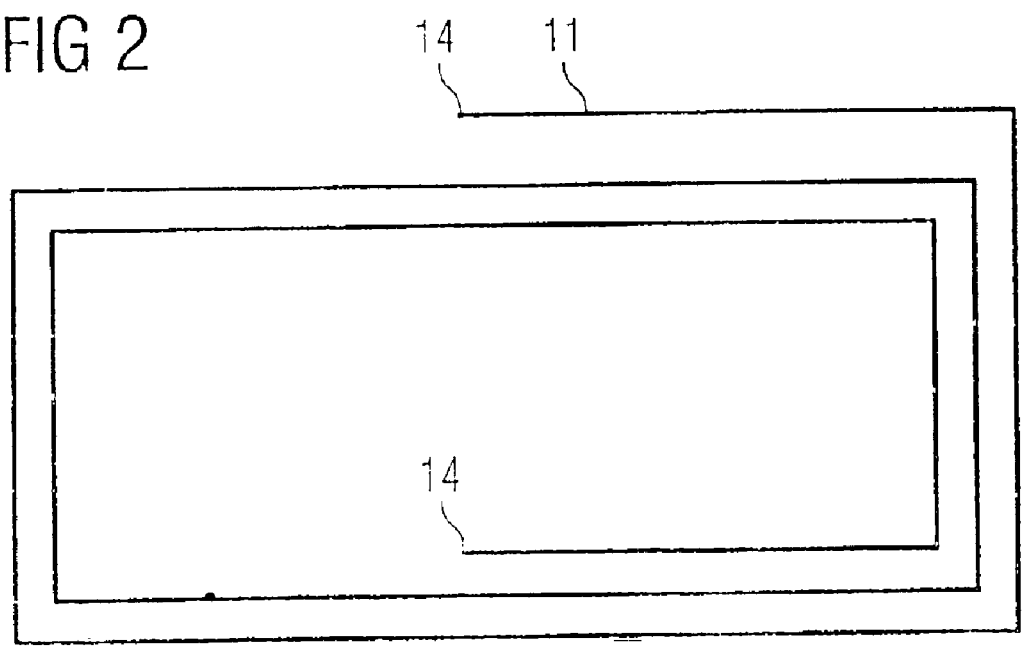
FIG. 2 is an illustration of a normal loop antenna.

In the second exemplary embodiment shown in FIGS. 2 to 4, a loop antenna 11 and a dipole antenna 12 are interconnected such that reception is likewise possible in different frequency bands. Coil connections 14 of the loop antenna 11 in FIG. 2 are connected to ends 15 of the dipole antenna 12 shown in FIG. 3. This thus results in the dipole antenna 12 and the loop antenna 11 being connected in series. Connections 16 of the dipole antenna 12 form the common connection for the interconnected antennas 11 and 12. The dipole antenna 12 is virtually totally ineffective in the VHF band, but is electrically conductive. When a VHF signal is being received, this is thus present at the connections 16 of the dipole antenna 12, without this adversely affecting the VHF signal.

When a UHF signal is being received, the loop antenna 11 has no disadvantageous effect on the UHF signal, which can likewise be tapped off at the connections 16 of the dipole antenna 12. As in the exemplary embodiment shown in FIG. 1, a device 17 is provided for identifying a transmission band with the strongest received signal is provided in FIG. 4. The device 17 no longer needs to control a data processing unit 13, however, in order to switch to different antennas 11 and 12, and it is sufficient to set the received signal preprocessing unit 18 to this transmission band.

In an embodiment of the data storage medium according to the first exemplary embodiment shown in FIG. 1, the second or third antenna can be used in order to transmit power using the second "free" antenna, decoupled from the data. It is thus also possible to transmit data and power at different frequencies, which leads to advantages in the identification confidence.

The capacitive antenna is distinguished in that it acts like a capacitor at very short distances and can be used to transmit both data and power via the capacitive field. As shown in FIG. 1, the capacitive antenna may be in the form of a third antenna, or else may be in the form of an integral component of one of the two other antennas 1 or 2.

We claim:

1. A contactless data storage medium, comprising:
   a data processing unit having a device for identifying a transmission band with a strongest received signal, and a received signal preprocessing unit being be set to the transmission band; and
   at least two antennas for respectively different transmission bands, at least two of said antennas being directly connected to one another.

2. The contactless data storage medium according to claim 1, wherein a first of said antennas is a dipole antenna and a second of said antennas is a loop antenna.

3. The contactless data storage medium according to claim 1, further comprising an additional capacitive antenna.

4. The contactless data storage medium according to claim 1, wherein data is transmitted via one of said antennas, and power for supplying power to the contactless data storage medium is transmitted via another one of said antennas.

5. The contactless data storage medium according to claim 2, wherein said at least two antennas are individually produced components, and electrically conductively connected to one another.

* * * * *